United States Patent
Donner et al.

(10) Patent No.: US 10,274,648 B2
(45) Date of Patent: Apr. 30, 2019

(54) ADAPTIVE THERMAL MICRO LENS

(71) Applicants: FUNDACIÓ INSTITUT DE CIÈNCIES FOTÒNIQUES, Barcelona (ES); INSTITUCIÓ CATALANA DE RECERCA I ESTUDIS AVANÇATS, Barcelona (ES)

(72) Inventors: Jon Donner, Barcelona (ES); Renaud Marty, Barcelona (ES); Romain Quidant, Barcelona (ES)

(73) Assignees: FUNDACIÓ INSTITUT DE CIÈNCIES FOTÒNIQUES, Barcelona (ES); INSTITUCIÓ CATALANA DE RECERCA I ESTUDIS AVANÇATS, Barcelona (ES)

( * ) Notice: Subject to any disclaimer, the term of this patent is extended or adjusted under 35 U.S.C. 154(b) by 0 days.

(21) Appl. No.: 14/289,426

(22) Filed: May 28, 2014

(65) Prior Publication Data
US 2015/0346394 A1    Dec. 3, 2015

(51) Int. Cl.
*G02B 3/00* (2006.01)
*G02B 27/00* (2006.01)
*G02F 1/01* (2006.01)
*G02B 7/02* (2006.01)
(Continued)

(52) U.S. Cl.
CPC ............ *G02B 3/0081* (2013.01); *G02B 3/14* (2013.01); *G02B 7/028* (2013.01); *G02B 26/004* (2013.01);
(Continued)

(58) Field of Classification Search
CPC ........ G02B 3/0081; G02B 3/14; G02B 7/028; G02B 26/004; G02B 26/0866; G02B 27/0068; G02F 1/0147
(Continued)

(56) References Cited

U.S. PATENT DOCUMENTS 4,872,743 A    10/1989    Baba et al.
7,828,435 B1   11/2010    Rehse
(Continued)

FOREIGN PATENT DOCUMENTS

DE    102007051291    4/2009
EP    1304591 A1      4/2003

OTHER PUBLICATIONS

International Search Report and Written Opinion for International Application No. PCT/EP2015/061683 dated Sep. 23, 2015.
(Continued)

*Primary Examiner* — Wen Huang
(74) *Attorney, Agent, or Firm* — Jenkins, Wilson, Taylor & Hunt, P.A.

(57) ABSTRACT

The present disclosure relates to a thermally modulated optical lens apparatus that includes an electrically resistive element that has patterned features. The patterned features may be micro-sized or smaller and may create an electrical resistance density across the electrically resistive element. The electrically resistive element is capable of electrically connecting to a controllable electrical source. The apparatus also includes at least one thermo-optical material in thermal contact with the patterned features of the electrically resistive element. The at least one thermo-optical material can have an optical refractive index profile that corresponds to the electrical resistance density.

25 Claims, 7 Drawing Sheets

(51) Int. Cl.
  *G02B 3/14*  (2006.01)
  *G02B 26/00* (2006.01)
  *G02B 26/08* (2006.01)

(52) U.S. Cl.
  CPC ..... *G02B 26/0866* (2013.01); *G02B 27/0068* (2013.01); *G02F 1/0147* (2013.01)

(58) Field of Classification Search
  USPC ......................................................... 359/288
  See application file for complete search history.

(56) References Cited

U.S. PATENT DOCUMENTS

| | | |
|---|---|---|
| 9,606,419 B2 | 3/2017 | Donner et al. |
| 9,804,424 B2 | 10/2017 | Donner et al. |
| 2005/0117195 A1 | 6/2005 | Glebov et al. |
| 2011/0080569 A1 | 4/2011 | Eva et al. |
| 2011/0109050 A1* | 5/2011 | Kovacs .................. A62C 2/065 277/627 |
| 2013/0194323 A1 | 8/2013 | Choi et al. |
| 2015/0268532 A1 | 9/2015 | Donner et al. |
| 2016/0178516 A1 | 6/2016 | Abdulhalim |
| 2017/0184882 A1 | 6/2017 | Donner et al. |

OTHER PUBLICATIONS

Office Action corresponding to U.S. Appl. No. 14/222,349 dated Feb. 24, 2016.
Office Action corresponding to U.S. Appl. No. 14/222,349 dated Aug. 9, 2016.

\* cited by examiner

ADAPTIVE THERMAL MICRO LENS

FIELD

The present disclosure relates to thermal micro lenses, and more particularly to lenses that have the ability of changing their properties by an induced temperature change and are thus tunable.

BACKGROUND

Integrated micro-optical elements have played a central role in data storage, optical displays and imaging systems. Fine alignment and focus adjustment in these systems is usually performed by means of mechanical parts that are often expensive, fragile and slow.

To overcome limitations introduced by mechanical adjustment, different electrical based inventions have been proposed. A first strategy relies on reshaping the surface of a liquid using an electrical signal without altering the thermo-optical properties of the material. For instance, the electro wetting lens described in U.S. Patent Application Publication No. 2013/0194323 demonstrates that the shape of a liquid drop can be modified by applying a voltage. The local voltage applied to the surface changes the contact angle between the drop and the surface, thus modifying the shape of the drop, which results in a change of the focal point associated to the liquid based micro lens. Nevertheless, such an approach suffers from drawbacks, which include (but are not restricted to) difficulties of integration, slow time response (in some applications, acceleration of the system could alter the shape of the drop and introduce imperfections in the lens) and inability to simultaneously image multiple planes with a single lens.

A second strategy uses an electrical excitation to deliver energy which alters a lensing material, placed between two electrodes, and tunes its properties. Following this strategy, an electrically excited thermo-optical lens as disclosed in U.S. Patent Application Publication No. 2005/0117195 has been invented. In this patent, a thermo-optical polymer is enclosed between two optically transparent surfaces, one of them curved, and a temperature controller is coupled to the thermo-optical material. Although this lens allows for the change of focal property, it does not allow for finer control such as local adjustment of the focal point. Furthermore, when considering this invention in a matrix configuration, there is a need to electrically address each lens, which could result in a complex engineering of the lens system, prohibiting its use in some applications.

SUMMARY

The subject matter of the present application has been developed in response to the present state of the art, and in particular, in response to the problems and needs of lens devices. In general, the subject matter of the present application has been developed to provide an apparatus and system for thermally modulating optical lenses that overcome at least some of the above-discussed shortcomings of the prior art.

One embodiment of the present disclosure relates to a thermally modulated optical lens apparatus that includes an electrically resistive element that has patterned features. The patterned features may be micro-sized or smaller and may create an electrical resistance density across the electrically resistive element. The electrically resistive element is capable of electrically connecting to a controllable electrical source. At least one thermo-optical material is in thermal contact with the patterned features of the electrically resistive element. The heat transferred from the patterned features of the electrically resistive element to the at least one thermo-optical material creates an optical refractive index profile in the at least one thermo-optical material that corresponds to (e.g., is based on and/or is a function of) the electrical resistance density.

In one implementation of the thermally modulated optical lens apparatus, the patterned features are spatially configured to impart non-uniformity to the electrical resistance density, which in turn affects the optical refractive index profile. In another implementation, the patterned features are made from a plurality of different materials to impart non-uniformity to the electrical resistance density, which in turn affects the optical refractive index profile.

In yet some implementations of the thermally modulated optical lens apparatus, the patterned features are formed using a plurality of fabrication techniques to impart non-uniformity to the electrical resistance density, which in turn affects the optical refractive index profile. One of the plurality of fabrication techniques is doping.

In one implementation of the thermally modulated optical lens apparatus, the electrically resistive element further includes a substrate upon which or within which the patterned features are disposed. The substrate may be made from a translucent material so that the thermally modulated optical lens can be used in a light transmission configuration. For example, the translucent material may be selected from the group that includes glass, quartz, silica, plastics, and polymers. Additionally, the electrically resistive element may also be translucent. In one implementation, the substrate is made from a non-translucent material so that the thermally modulated optical lens can be used in a light reflection configuration. For example, non-translucent material may be selected from the group that includes silica and silicon. The thermally modulated optical lens apparatus may further include a heat transfer medium disposed between the electrically resistive element and the at least one thermo-optical material.

Additionally, according to some implementations of the thermally modulated optical lens apparatus, the electrically resistive element may include an array of electrical resistors. The apparatus may further include a controllable electrical wiring network for selectively activating certain electrical resistors of the array of electrical resistors to control the electrical resistance density.

Another embodiment of the present disclosure relates to a thermally modulated optical lens system that includes an electrically resistive element that has patterned features. The patterned features may be micro-sized or smaller and may create an electrical resistance density across the electrically resistive element. The system further includes a controllable electrical source electrically connected to the electrically resistive element for controlling heat generated at the patterned features of the electrically resistive element. Still further, the thermally modulated optical lens system includes at least one thermo-optical material in thermal contact with the patterned features of the electrically resistive element. Heat transferred from the patterned features of the electrically resistive element to the at least one thermo-optical material creates an optical refractive index profile in the at least one thermo-optical material that corresponds to the electrical resistance density.

In one implementation of the system, the controllable electrical source is an AC source and the wave-form of the AC current contributes to the electrical resistance density across the electrically resistive element. In another implementation of the system, the electrically resistive element includes an array of electrical resistors. According to yet another implementation, the at least one thermo-optical material includes a stack of thermo-optical lenses positioned on top of each other.

In certain implementations, the system may further include at least one light source that is modulated by the at least one thermo-optical material. The spectrum, angle, and polarization of light emanating from the light source may be controllable. For example, at least a portion of light emanating from at least one light source may be modulated/adapted by passing through and/or reflecting off of the thermo-optical material.

According to another embodiment, the present disclosure relates to a thermally modulated optical lens system that includes a plurality of electrically resistive elements that have patterned features. The patterned features are micro-sized or smaller and create an electrical resistance density across the electrically resistive element. The system further includes a controllable electrical source electrically connected to the plurality of electrically resistive elements for controlling heat generated at the patterned features. The system also includes a light source and at least one thermo-optical material in thermal contact with the patterned features of the plurality of electrically resistive elements. The heat transferred from the patterned features of the plurality of electrically resistive elements to the at least one thermo-optical material creates an optical refractive index profile in the at least one thermo-optical material that corresponds to the electrical resistance density. At least some of the light emanating from the light source is modulated according to the optical refractive index profile of the at least one thermo-optical material.

In yet another embodiment, the present disclosure relates to a method for modulating light. The method includes providing at least one electrically resistive element that has the patterned features. The patterned features can be micro-sized or smaller and the configuration/pattern of the features can create an electrical resistance density across the electrically resistive element. The method further includes providing at least one thermo-optical material that is in thermal receiving contact with the patterned features of the at least one electrically resistive element. The method also includes providing at least one controllable electrical source that is electrically connected to the at least one electrically resistive element. Additionally, the method includes providing a light source, where at least one portion of light emanating from the light source is directed towards the at least one thermo-optical material. The method further includes actuating the at least one controllable electrical source to dissipate heat from the at least one electrically resistive element. The dissipating heat, or at least a portion of the dissipating heat, is transferred from the patterned features of the at least one electrically resistive element to the at least one thermo-optical material in order to create an optical refractive index profile in the at least one thermo-optical material that corresponds to the electrical resistance density. The at least one portion of light emanating from the light source is modulated according to the optical refractive index profile of the at least one thermo-optical material. In some implementations, the transmission, reflection, polarity, spectrum, and/or angle (among other properties) of the light is controlled, altered, adjusted, adapted, modulated, or otherwise affected by the optical refractive index of the thermo-optical material.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

The adaptive thermal micro lens of the present disclosure includes at least an electrically resistive element with patterned features. The patterned features are patterned at micro or nano scale and driven by a controllable electrical source and a thermo-optical material in thermal contact with the resistive element. The heat generation inside the electrically resistive element leads to a temperature pattern that modifies, in a controlled/predictable way, the optical refractive index of the thermo-optical material. The terms "patterning"

and "making patterned features" refer to introducing a predetermined spatial design, with micro or nano-meter sized features, to the electrically resistive element to gain control over the local resistance. The patterning of the resistive element is designed in such a way that it induces heat dissipation in predefined locations when an electrical voltage is applied across the resistive element. The configuration/layout of the patterned resistor features is defined as the electrical resistance density. When a voltage is applied to the electrically resistive element, at least a portion of the heat dissipating from the electrically resistive patterned features is transferred, directly and/or indirectly, to the thermo-optical material to modify the optical properties of the material and generate an optical refractive index profile that is related to the electrical resistance density. Therefore, patterning a resistor at the micro and nano scales is used to dynamically generate specific lensing profiles (i.e., optical refractive index profiles) in the thermo-optical material at the corresponding scales of the electrical resistance density, thus allowing a user to impart specific lensing properties to the thermo-optical material. For example, in one embodiment the optical refractive index profile is related to the electrical resistance density according to a certain function or mapping. In one embodiment, the spatial design includes the change of spatial density per unit length, the use of a material for which its properties are modified in space (for example by means of a manufacturing technique such as doping, impurity implantation, and substitution, among others), or the combination of different materials. In other words, the electrical resistance density can be modified (i.e., made non-uniform) by modifying the spatial layout of the patterned features, modifying the application/fabrication method of the patterned features, and/or modifying the material from which the patterned features are formed, among others.

In this manner, the wave front of an incoming light source in at least one location may be adjusted. This can be used to locally modify the focal length throughout the plane or to refract an incoming light source.

At least one controllable electrical source is connected, or at least is connectable, to the at least one electrically resistive element to produce heat at the specific locations of the patterned features. The electrical source may deliver controllable electrical power continuously (DC) or modulated, wave-form power (AC) or a combination of both. A time dependent electrical signal could serve to modify the power dissipation properties of the considered resistive element, or to modulate in time the power dissipation.

The adaptive micro lens of the disclosure uses electrical excitation to deliver electrical energy which is converted to heat in a resistor which alters the thermo-optical properties of the thermo-optical material and enables a fine tuning of its optical properties. In this way, a predetermined distribution of temperature is created within the thermo-optical material. By patterning the electrical resistive element at the micro or nano scale, that is, introducing a predetermined spatial design with micro or nano-meter sized features, control over the local resistance and thus temperature is obtained. Once again, the term "spatial design" includes the change of spatial density per unit length, the use of a material for which its properties are modified in space (for example by means of doping, impurity implantation or substitution), or the combination different materials. This permits local adjustment of the focal point of an incoming light source impinging the dispositive or to control the light direction (deviate the incident light). This results in the creation of different focal planes induced by a single element for the considered incoming light source. Note that by "light source" it is meant electromagnetic radiation, including but not limited to X-Rays, ultraviolet, visible, infrared, near infrared, short wavelength infrared, mid wavelength infrared, long wavelength infrared, far infrared, radiowave and radar sources.

Examples of thermo optical materials include various liquids (such as water, octane, alcohols, glycerol, biological medium (blood, plasma, etc)), gases (such as air, helium) and solids (such as glass, silica, quartz, plastics or polymers including: PMMA, Epoxy, sol-gel (with or without diphenysilane), silicone, PEMA, B-PEEK, polycarbonate, polystyrene, Urethane acrylate elastomer). The change in refractive index is driven by the temperature profile, resulting in a local patterning of the refractive index. In this manner, the focal length in at least one location may be adjusted, and the focal length throughout the plane can be locally modified. This modification can be performed in a continuous fashion resulting in a continuous control of the focal length or in discrete steps. Discrete steps can be achieved by patterning a single resistive element or by using an array/matrix of individual thermal lenses. The thermo optical material can be homogeneous or may comprise thermal barriers (materials of different thermal conductivity) between adjacent temperature controlled regions to provide thermal isolation between regions. The barriers can be applied by evaporation or sputtering and using a mask to pattern their location. The same process would be applied for a solid, liquid or gas phase thermo-optical material. In yet another aspect of the disclosure, a method of modifying an existing lens is proposed, where the resistors are patterned onto the existing lens with the same techniques as explained after, which will act as the thermo-optical material, and when connected to an electrical source can change the focal depth and lateral position of the focal point of the original existing lens.

Figure 1A:
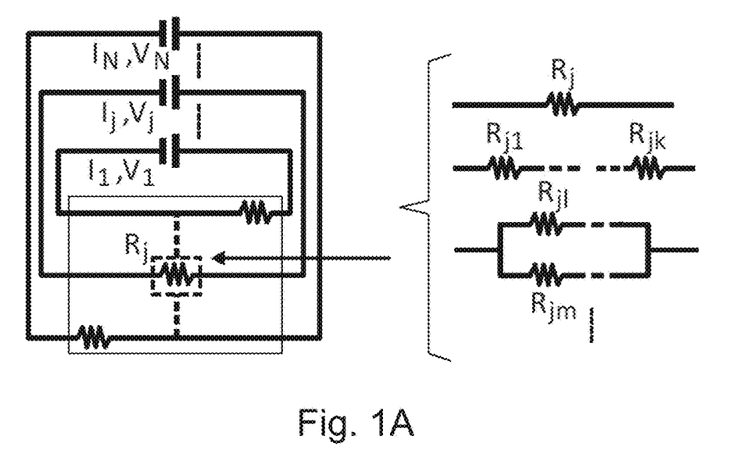
FIGS. 1A-C are schematic illustrations of the principle of an adaptive thermal lens with patterned resistors according to one embodiment.

In one embodiment (FIGS. 1A-1C), the resistor 1 is patterned onto a substrate/surface 2 or inside a material. The electrically resistive element, and its patterned features, can be made from a conductive material, such as gold, aluminium, copper, zinc, iron and silver among others. The surface or material touching the patterned features of the electrically resistive element can be the thermo-optical material itself 3 or a heat transfer medium 4, so long as the electrically resistive element is in some form of thermal contact with the thermo-optical material, and thus can modify the temperature in the latter. Such material can be a transparent/translucent material such as glass in order to use the adaptive lens in a transmission configuration (i.e., transmission mode). The patterned features may be connected to an electrical source (FIG. 1A). A single electrical source can be connected to one or several resistive elements, which can be connected to each other in parallel, series or a combination of both as sketched in FIG. 1A.

Figure 1B:
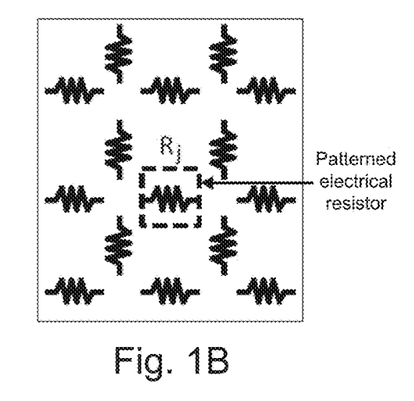

In another embodiment, the disclosure can comprise an array of different electrically resistive elements controlled independently (FIG. 1B). Several such arrays can also be stacked on top of each other.

Because of the temperature diffusion, patterning the electrically resistive element(s) at the micro or nano scales provides better spatial resolution than the use of multiple neighbouring electrically resistive elements. The electrical source can deliver electrical power continuously (DC) or modulated in time at any frequency (AC) or a combination of the both, and being controllable in power and/or frequency. In the case of AC mode, the time dependent electrical signal could serve to modify the power dissipation properties of the considered electrically resistive element, or to modulate in time the power dissipation. By thermal contact it is implicit that physical contact is not necessary. In other words, the disclosure can incorporate a thermally conducting medium/material between the electrically resistive elements and the thermo optical material as long as the electrically resistive elements generate heat when excited by the considered electrical source.

The image focal plane of the lens can be dynamically shaped by a control electrical signal from the source. The approach relies on the temperature dependence of the refractive index of some materials and the ability of electrically resistive elements to generate heat and create a predetermined distribution of temperature when passing an electrical signal through. A local increase of temperature induces a change in the refractive index that affects the propagation of light. All this applies also to embodiments with one individual electrically resistive element.

Figure 1C:
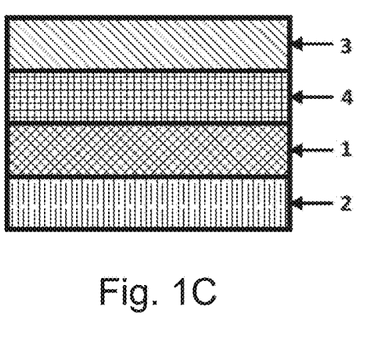

As illustrated in FIG. 1, a patterned electrically resistive element dissipates at least a part of an electrical signal. This energy dissipation results in a temperature increase of a thermo-optical material that is in thermal contact with at least a part of the electrical resistors. Therefore, the optical index of the thermo-optical material can be modulated in space and time by controlling electrical power supplies. This optical index modulation may refract an incoming light source when the latter crosses the thermo-optical material. The light source can arrive at the thermo-optical material either through the electrically resistive element's material or directly to the thermo-optical material. Also, depending on the reflectivity/transmission of the system, the subject matter of the present disclosure can be used in transmission and/or in reflection.

Figure 2A:
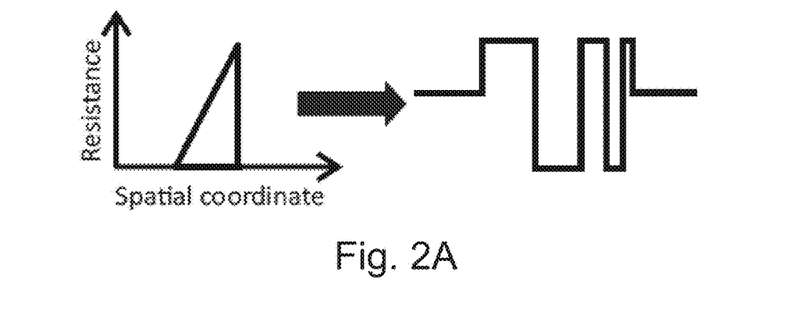
FIGS. 2A-C show various schematic examples of the spatial patterning of the resistor at the micro or nano scale.
Figure 2B:
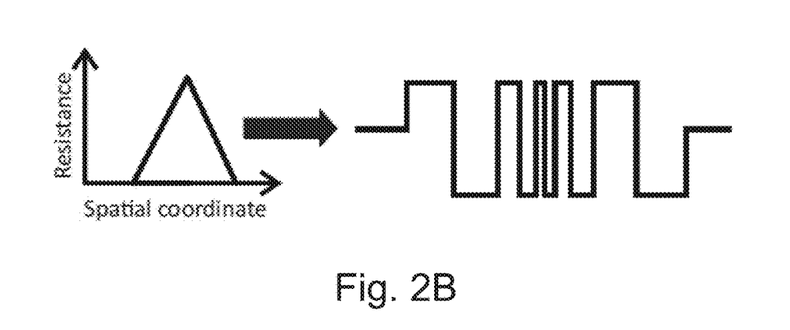
Figure 2C:
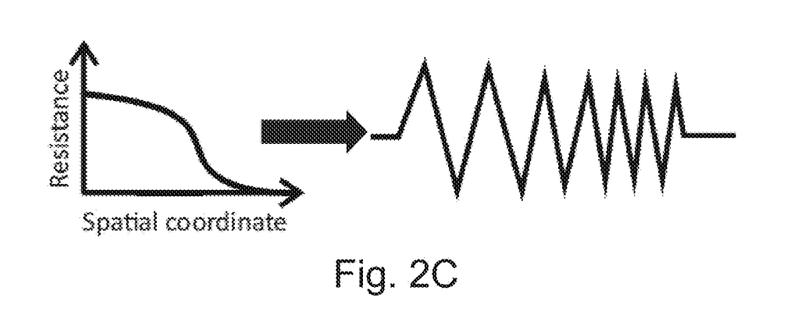

The patterning at the micro or nano scale of the patterned features, as shown in FIG. 2, can be used to produce different functions with higher degrees of complexity/control from the one of a classical lens while using only one patterned resistor excited with a single electrical source. The patterning of the said resistive element is designed in such a way that it induces heat dissipation in predefined locations, when applying an electrical voltage to the electrically resistive element, thus enabling to project a desired non uniform optical refractive index map into the thermo-optical material. Therefore, patterning a electrically resistive element at the micro and nano scales can be used to dynamically generate electrical resistance densities, which impart, through the transfer of heat, optical refractive index profiles to the thermo-optical material, thus generating specific lensing profiles in a thermo-optical material.

FIGS. 2A-2C show a schematic of three examples of how a desired spatial resistance can be obtained with a specific pattern of the electrically resistive elements. It is important to notice that a given resistance pattern can be obtained in different ways and we here only show specific examples. Also, the patterns that can be done are not limited to these three examples but any desired spatial pattern of the electrically resistive elements can be realized by using, for example, the techniques proposed in the description of FIG. 4.

Figure 3A:
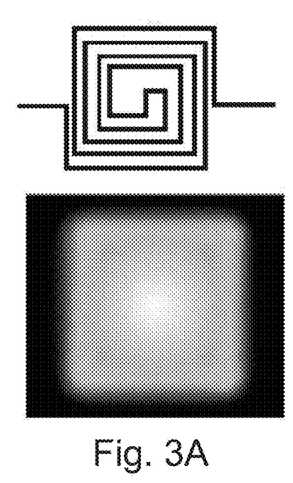
FIGS. 3A-C show different patterns of the resistor and the resulting effect on the lensing properties of the micro lens of the disclosure.
Figure 3B:
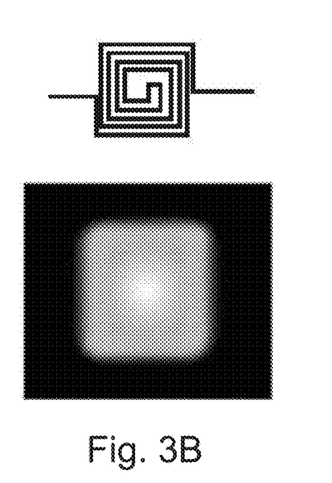
Figure 3C:
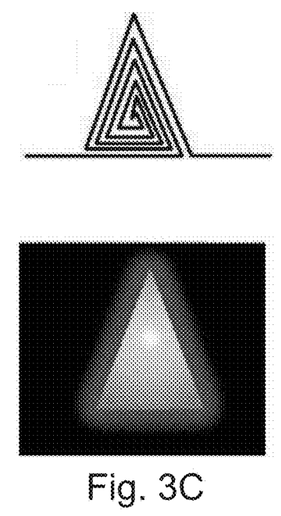

FIGS. 3A-3C show schematic examples of how a specific patterning of the electrically resistive elements can lead to a desired local focus shift map when delivering electrical power to the patterned features.

Specifically, three illustrations of different patterned electrically resistive elements are presented (FIG. 3A-3C top), and their corresponding focus shift maps are presented, when an electrical power is applied to the said electrically resistive elements (FIG. 3A-3C bottom). The relative focus shift amplitudes are presented for each case with a gray scale color map. The correspondence between the size and/or shape of the structures acting as patterned features when passing an electric current through in FIGS. 3A-3C demonstrates that micro and/or nano patterning of the electrically resistive elements directly impacts the lensing properties of the micro-lenses. The patterning of the electrically resistive elements can be used to reduce the size of the lens and/or to produce micro lenses having complex shapes which could be either impossible or extremely technologically complex/challenging and costly to achieve using many individually addressable lenses. Such an example is given in FIGS. 3A-3C where the use of a micro and nano structuration fabricated by the procedure mentioned above enables to create a lens having a non-uniform distribution but rather a spatial gradient distribution acting on the wave front of an incoming light source. The spatial gradient refers to the change of density of the resistance per length unit. As a practical example, it is also possible to pattern a electrically resistive element in order to decrease the aberrations of lenses by adding a gradient in the resistor pattern. These gradient patterned resistors provide more complex results that are not achievable using conventional micro lenses.

Figure 4A:
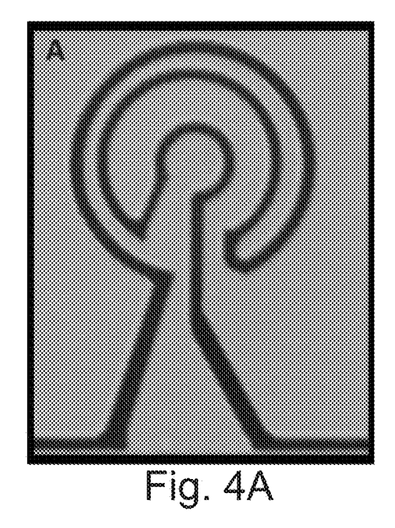
FIGS. 4A-4B show optical microscope images of a single resistor patterned at the micro-scale and how the resistor is electrically connected.
Figure 4B:
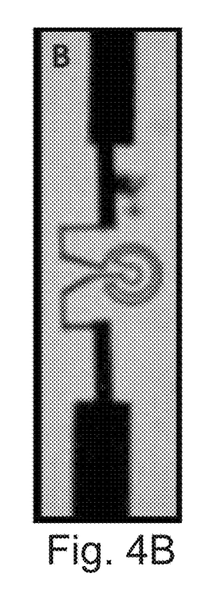

As a practical example of a patterned electrically resistive element, spiral resistor features with different sizes were made with a varying density in the radial direction, one example is presented in FIG. 4A-4B. This can be used as a way to modify other lenses. The electrically resistive elements are patterned such that the desired temperature distribution and thus local focus shifts are achieved. The patterned features define the size and location of the heating areas which give rise to the lensing effect because of their interactions with the thermo-optical materials. It is therefore clear that the size and/or location of the region where the optical index is modified are not exactly the same as the physical size of the patterned features. In FIG. 4A, a bright field (BF) microscopy image of a single electrically resistive element patterned at the micro-scale is shown. In this case, the electrically resistive element is obtained by rolling a wire in a spiral shape in a given spatial position. The region of the spiral shape will then present a much higher resistance than the other part of the wire. To fabricate such electrically resistive element, UV lithography and electron beam lithography techniques were combined with evaporation techniques to deposit gold in the desired pattern. This procedure enables to control the spatial patterning of the electrically resistive element at the micro and/or nano-scale. In FIG. 4B is presented one example of a electrically resistive element in a sample having different features made of gold, patterned at different scales, and having different sizes. This second BF image has been taken with a wider field of view in order to show the electrical wiring of the electrically resistive element. The wires used to connect the patterned features are also connected to large metallic pads used as electrodes to provide a connection with an external electrical source. Other techniques used in standard electronic industry might be preferred to produce an implementation based on the disclosure, for example, the lithography stages could be replaced with laser writing techniques.

In some embodiments, the electrically resistive elements are inside or on a substrate. The substrate can be made of glass, quartz, silica, plastics, or polymers among others. This enables to use the lens in a transmission configuration. Alternatively, the substrate could be made of an opaque material such as silicon, etc. which enables to use the adaptive lens in reflection mode. Also, the substrate can have a dependence of the light transmission (for example spectral, angle or polarization dependence), which enables to work in transmission and reflection mode simultaneously. This kind of substrate can be created by different means including a layered media or a dichroic element.

The electrically resistive elements and electrical wiring can be positioned on top of a substrate, patterned onto the same. They can be made of different materials including metals (for example gold, aluminium, copper, iron, zinc, or silver) and alloys (for example iron alloys such as). The patterning can be done by e-beam lithography, photo-lithography, laser writing, evaporation, sputtering, reactive ion etching (RIE) and/or chemical vapor deposition (CVD). When the electrically resistive element(s) is (are) transparent or semi-transparent (for instance ITO, very thin conductors or patterns like a spiral or ring which have less than 50% coverage area), the same can be inserted in the optical path.

FIG. 5 shows the lens transfer function characterization of the resistive elements. The relationship (e.g., transfer function) between the electrical power, expressed by the voltage (FIG. 5A) or current (FIG. 5B) delivered by an external electrical source in the invention, and the resulting focus shift of an incident light source (blue laser diode of wavelength 473 nm) crossing the center of the electrically resistive element was measured on the same electrically resistive element (FIG. 4A) and for the same electrical excitation configuration considered in FIG. 4B. This linear relationship unambiguously demonstrates the ability of such devices to finely tune a local adjustment of the focal point of an incoming light source. Also, the focus shift in absence of a resistor ("x" cross symbols) and when passing current through a low resistance conducting wire ("+" cross symbols) were also measured in the same conditions for different electrical current powers in FIG. 5A.

Figure 5A:
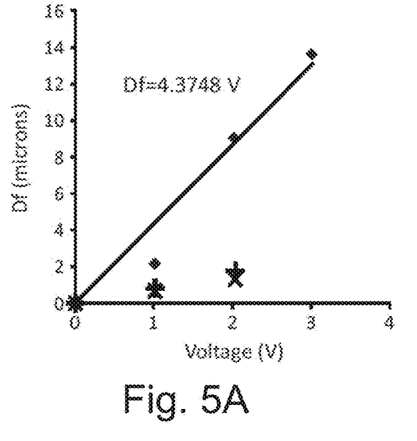
FIGS. 5A-5D show the lens transfer function characterization relating electrical energy applied to resistive elements and focus shift produced by the induced lens.
Figure 5B:
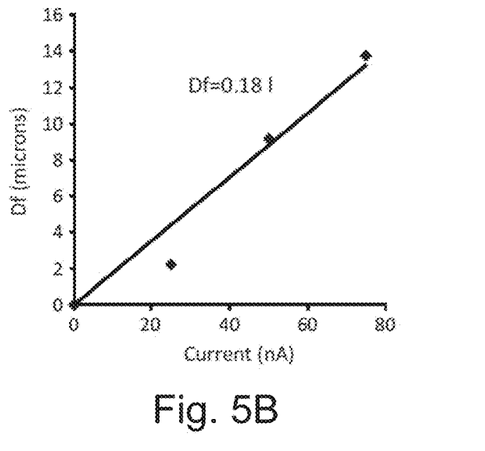
Figure 5C:
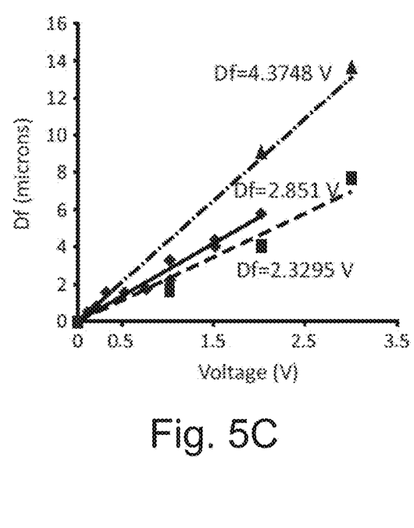

FIG. 5C shows a comparison of the focus shift produced by different electrically resistive elements similar to the one presented in FIG. 4B. This graph clearly demonstrates that the patterning of the electrically resistive element on a substrate clearly affects its ability to locally modify the focus shift of an incident light source (blue laser diode of wavelength 473 nm). Indeed, each electrically resistive element presents a linear behavior with respect to the incoming electrical power (voltage in the case presented in FIG. 5C) but the exact values of the slopes depend on the micro and/or nano structuration of the considered electrically resistive element. Consequently, the focus shift provided above each resistor for the same incoming current is different, which means that the final image is focused on different planes depending on the considered spatial position with respect to the resistors.

Figure 5D:
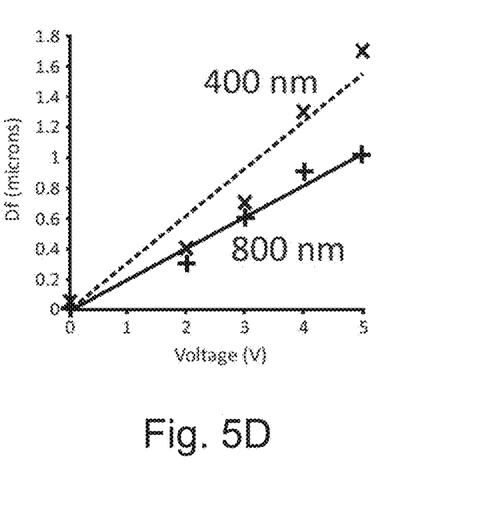

FIG. 5D compares the focus shift measured in FIG. 5A for the same experimental conditions and the same electrically resistive element but for another incident light source (light source with a wavelength of 800 nm). This demonstrates that the focus shift could also depend on the considered incoming wavelength. Therefore, a thermo-optical material or a combination of thermo-optical materials can be engineered to adjust differently the focus of different light sources or light source spectral components in order to multiplex the signal.

Figure 6A:
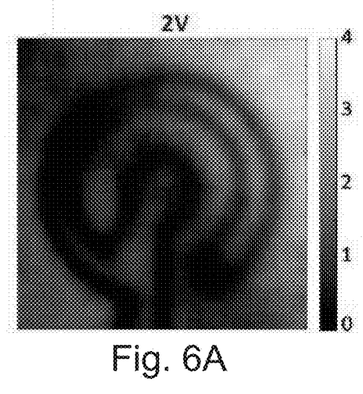
FIGS. 6A-6B show focus shift maps induced by a patterned resistor excited by different electrical voltages.
Figure 6B:
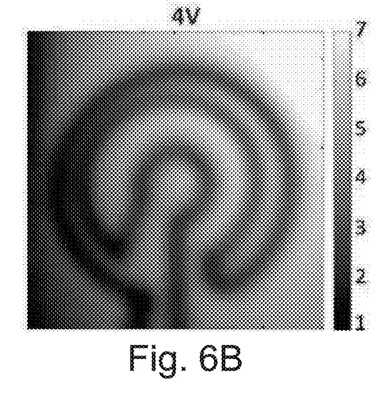

In FIG. 6A the complex spatial dependent focus shift resulting from the micro scaled patterning of the electrically resistive element is presented. Furthermore, comparing FIGS. 6A and 6B illustrates the ability to dynamically change the local focus shift of a given electrically resistive element by modifying the applied electrical power. In FIGS. 6A and 6B, a voltage of 2 and 4 volts are applied to the spiral electrically resistive element presented in FIG. 4A, which induce focus shifts of up to 4 and 7 microns, respectively.

Figure 7A:
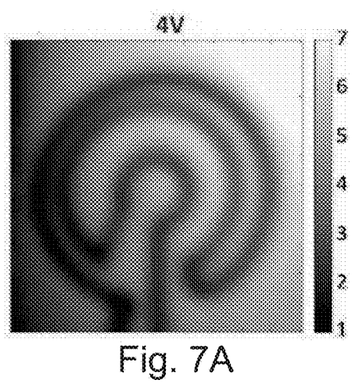
FIGS. 7A-7B show focus shift maps induced by resistive elements differently patterned at the micro scale.
Figure 7B:
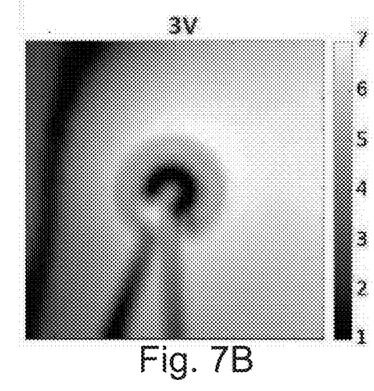

Similarly, in FIGS. 7a and 7B, voltages of 4V and 3V were applied to two spiral electrically resistive elements having diameters of 50 and 20 microns, respectively. An optical image of the two considered electrically resistive elements is presented in FIG. 3B. The applied power generates focus shifts of up to 7 microns in the vicinity of the electrically resistive elements. Due to the different sizes and patternings of the electrically resistive elements different focus shift maps are obtained. This illustrates the importance of micro scale patterning of the electrically resistive elements for the resulting focus shift maps of the lens. Therefore, such maps provide a practical example of the schemes presented in FIGS. 3A-3C.

Figure 8:
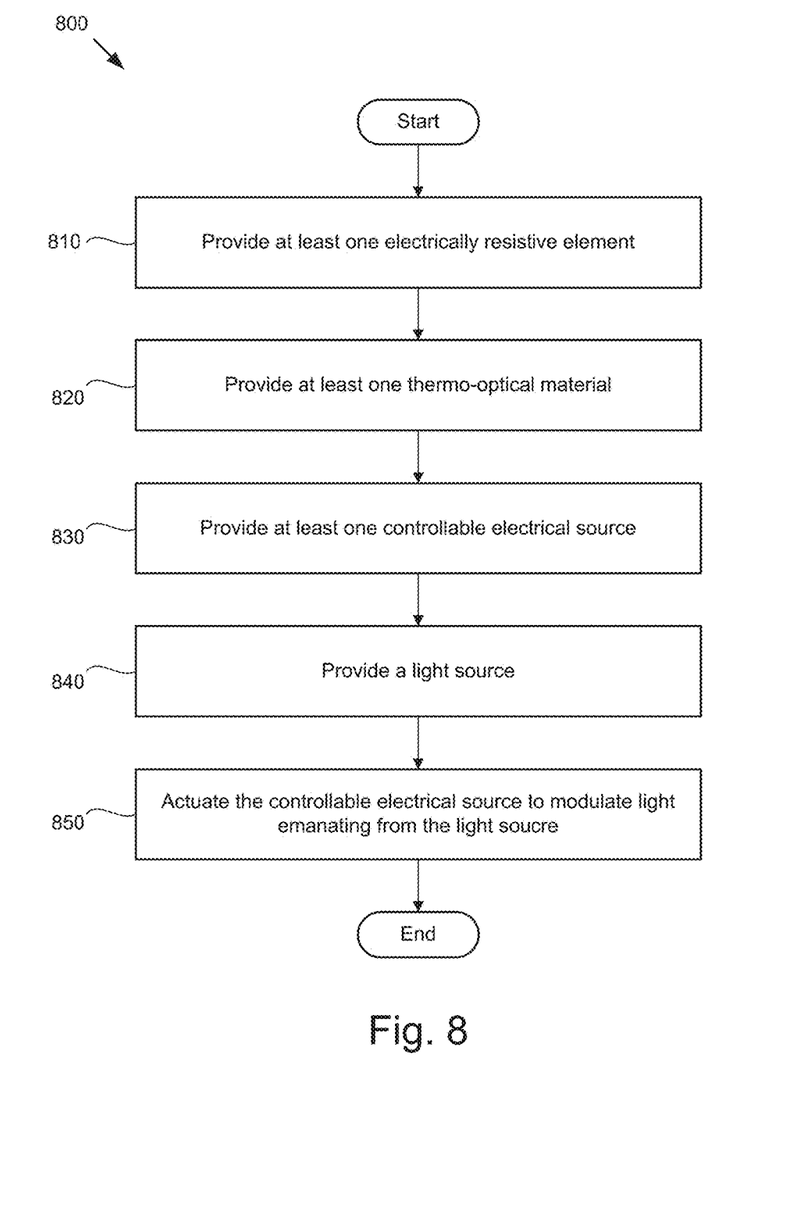
FIG. 8 is a schematic flow chart diagram of one embodiment of a method for modulating light.

FIG. 8 is a schematic flow chart diagram of one embodiment of a method 800 for modulating light. The method 800 includes providing at least one electrically resistive element that has the patterned features at 810. As disclosed above, in one embodiment the patterned features are micro-sized or smaller and the configuration/pattern of the features creates an electrical resistance density across the electrically resistive element. The method 800 further includes providing at least one thermo-optical material that is in thermal receiving contact with the patterned features of the at least one electrically resistive element at 820. Still further, the method 800 includes providing at least one controllable electrical source that is electrically connected to the at least one electrically resistive element at 830 and providing a light source at 840. In one embodiment, at least one portion of light emanating from the light source is directed towards the at least one thermo-optical material.

The method 800 also includes actuating the at least one controllable electrical source to dissipate heat from the at least one electrically resistive element at 850. The dissipating heat, or at least a portion of the dissipating heat, is transferred from the patterned features of the at least one electrically resistive element to the at least one thermo-optical material in order to create an optical refractive index profile in the at least one thermo-optical material that corresponds to the electrical resistance density. The at least one portion of light emanating from the light source is modulated according to the optical refractive index profile of the at least one thermo-optical material. In other words, the transmission, reflection, polarity, spectrum, and/or angle (among other properties) of the light is controlled, altered, adjusted, modulated, adapted, or otherwise affected by the optical refractive index of the thermo-optical material.

The disclosure also refers to a method for using adaptive thermal micro lenses. The method includes driving at least one adaptive thermal micro lens while providing at least one controllable electrical source. The method further includes connecting at least one electrically resistive element with the at least one controllable electrical source, thereby modulating the refractive index in a region of thermo-optical material in a controlled fashion that depends on the resistor pattern and the power supplied by the electrical source. The at least one controllable electrical source may be a single source and the micro lens array may further include an electrical network to contact/connect several electrically resistive elements and/or several patterned features. In such an embodiment, the method may further include manipulating the electrical network (by mean of an electrical switch or demultiplexer (demux) for example) to change position of the heating resistors. The method may also include using the at least one adaptive thermal micro lens to control an incoming light source. For example, the wave front of this light source may be controlled to modify its focal depth or to control the light direction (deviate a light beam for example).

In this text, the term "comprises" and its derivations (such as "comprising", etc.) should not be understood in an excluding sense, that is, these terms should not be interpreted as excluding the possibility that what is described and defined may include further elements, steps, etc.

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject matter of the present disclosure, however, absent an express correlation to indicate otherwise, an implementation may be associated with one or more embodiments.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

On the other hand, the disclosure is obviously not limited to the specific embodiment(s) described herein, but also encompasses any variations that may be considered by any person skilled in the art (for example, as regards the choice of materials, dimensions, components, configuration, etc.), within the general scope of the disclosure as defined in the claims.

The present subject matter may be embodied in other specific forms without departing from its spirit or essential characteristics. The described embodiments are to be considered in all respects only as illustrative and not restrictive.

What is claimed is:

1. A thermally modulated optical lens apparatus, comprising:
   an electrically resistive element comprising patterned features, wherein the patterned features form a spatial design where said patterned features are geometrical features sized at a micro-meter or nano-meter scale and form an electrical resistance density across the electrically resistive element, the electrically resistive element capable of electrically connecting to a controllable electrical source; and
   at least one thermo-optical material in thermal contact with the patterned features of the electrically resistive element to receive heat transferred thereby, wherein the at least one thermo-optical material has an optical refractive index profile that corresponds to the electrical resistance density, wherein the electrically resistive element comprises an array of electrical resistors and is configured to create a lensing effect with enough magnitude to perform a focus adjustment of the thermally modulated optical lens apparatus when receiving an electrical signal from said controllable electrical source, by simultaneously and locally modifying focal lengths of at least two laterally separated focal points of at least two respective focal lines throughout corresponding different planes of one of the at least one thermo-optical material,
   and further wherein the thermally modulated optical lens apparatus is made not to provide a lensing effect when no electrical signal is received by the electrically resistive element.

2. The thermally modulated optical lens apparatus of claim 1, wherein the patterned features are spatially configured to impart non-uniformity to the electrical resistance density and affect the optical refractive index profile.

3. The thermally modulated optical lens apparatus of claim 1, wherein the electrically resistive element further comprises a substrate upon which or within which the patterned features are disposed.

4. The thermally modulated optical lens apparatus of claim 3, wherein the substrate is made from a translucent material so that the thermally modulated optical lens can be used in a light transmission configuration.

5. The thermally modulated optical lens apparatus of claim 4, wherein the translucent material is selected from the group consisting of glass, quartz, silica, plastics, and polymers.

6. The thermally modulated optical lens apparatus of claim 4, wherein the electrically resistive element is translucent.

7. The thermally modulated optical lens apparatus of claim 1, further comprising a controllable and reconfigurable electrical wiring network for selectively connecting certain several electrical resistors of the electrical resistors of the array of electrical resistors, each occupying a different spatial position, to provide a selected electrical resistor arrangement in order to control the electrical resistance density.

8. A thermally modulated optical lens system, comprising:
an electrically resistive element comprising patterned features, wherein the patterned features form a spatial design where said patterned features are geometrical features sized at a micro-meter or nano-meter scale and form an electrical resistance density across the electrically resistive element;
at least one controllable electrical source electrically connected to the electrically resistive element; and
at least one thermo-optical material in thermal contact with the patterned features of the electrically resistive element to receive heat transferred thereby, wherein the at least one thermo-optical material has an optical refractive index profile that corresponds to the electrical resistance density;
wherein the electrically resistive element comprises an array of electrical resistors, and the electrically resistive element and the at least one controllable electrical source are configured to create a lensing effect with enough magnitude to perform a focus adjustment of the thermally modulated optical lens system by simultaneously and locally modifying focal lengths of at least two laterally separated focal points of at least two respective focal lines throughout corresponding different planes of one of the at least one thermo-optical material,
and further wherein the thermally modulated optical lens system is made not to provide a lensing effect when no electrical signal is received by the electrically resistive element.

9. The thermally modulated optical lens system of claim 8, wherein the controllable electrical source is an AC source and a wave-form of AC current from the AC source contributes to the electrical resistance density across the electrically resistive element.

10. The thermally modulated optical lens system of claim 8, wherein the at least one thermo-optical material comprises a stack of thermo-optical lenses positioned on top of each other.

11. The thermally modulated optical lens system of claim 8, further comprising a light source that is modulated by the at least one thermo-optical material.

12. The thermally modulated optical lens system of claim 11, wherein the spectrum, angle, and polarization of light emanating from the light source are controllable.

13. A method, comprising:
providing at least one electrically resistive element comprising patterned features, wherein the patterned features form a spatial design where said patterned features are geometrical features sized at a micro-meter or nano-meter scale and create an electrical resistance density across the electrically resistive element, and further wherein the at least one electrically resistive element comprises an array of electrical resistors;
providing at least one thermo-optical material in thermal contact with the patterned features of the at least one electrically resistive element to receive heat transferred thereby, wherein the at least one thermo-optical material is made not to provide a lensing effect when no heat is transferred from the at least one electrically resistive element;
providing at least one controllable electrical source electrically connected to the at least one electrically resistive element;

providing a light source, wherein at least one portion of light emanating from the light source is directed towards the at least one thermo-optical material; and
actuating the at least one controllable electrical source to dissipate heat from the at least one electrically resistive element, wherein at least a portion of the heat transferred from the patterned features of the at least one electrically resistive element to the at least one thermo-optical material creates an optical refractive index profile in the at least one thermo-optical material that corresponds to the electrical resistance density to create a lensing effect with enough magnitude to perform a focus adjustment by simultaneously and locally modifying focal lengths of at least two laterally separated focal points of at least two respective focal lines throughout corresponding different planes of one of the at least one thermo-optical material, wherein the at least one portion of light emanating from the light source is modulated according to the optical refractive index profile of the at least one thermo-optical material.

14. The thermally modulated optical lens apparatus of claim 1, wherein the electrically resistive element is configured to perform said focus adjustment of the thermally modulated optical lens apparatus when receiving an electrical signal from said controllable electrical source, also by locally modifying lateral positions of said at least two laterally separated focal points.

15. The thermally modulated optical lens apparatus of claim 1, wherein said at least one thermo-optical material is a plastic or polymer.

16. The thermally modulated optical lens apparatus of claim 15, wherein said plastic or polymer has a temperature coefficient of refractive index in the range of those associated to the following materials: PMMA, Epoxy, sol-gel with or without diphenysilane, silicone, PEMA, B-PEEK, polycarbonate, polystyrene, and Urethane acrylate elastomer.

17. The thermally modulated optical lens apparatus of claim 16, wherein said plastic or polymer includes at least one of PMMA, Epoxy, sol-gel with or without diphenysilane, silicone, PEMA, B-PEEK, polycarbonate, polystyrene, and Urethane acrylate elastomer.

18. The thermally modulated optical lens apparatus of claim 1, wherein said at least one thermo-optical material is a liquid or a gas.

19. The thermally modulated optical lens system of claim 8, wherein the controllable electrical source is a DC source.

20. The thermally modulated optical lens system of claim 8, wherein the controllable electrical source is a combination of a DC source and an AC source, which delivers a wave-form of DC and AC current.

21. The thermally modulated optical lens apparatus of claim 1, further comprising a controllable and reconfigurable electrical wiring network comprising an electrical switch or demultiplexer for selectively connecting several electrical resistors of the electrical resistors of the array of electrical resistors in different alternate configurations, in order to control the electrical resistance density.

22. The thermally modulated optical lens system of claim 8, further comprising a controllable and reconfigurable electrical wiring network comprising an electrical switch or demultiplexer for selectively connecting several electrical resistors of the electrical resistors of the array of electrical resistors in different alternate configurations, in order to control the electrical resistance density.

23. The thermally modulated optical lens apparatus of claim 1, wherein said at least one thermo-optical material forms a layer that has upper and lower surfaces which are flat, not to provide a lensing effect when no electrical signal is received by the electrically resistive element.

24. The thermally modulated optical lens system of claim 8, wherein said at least one thermo-optical material forms a layer that has upper and lower surfaces which are flat, not to provide a lensing effect when no electrical signal is received by the electrically resistive element.

25. The method of claim 13, further comprising:
providing a controllable and reconfigurable electrical wiring network comprising an electrical switch or demultiplexer; and
actuating the electrical switch or demultiplexer to selectively connect several electrical resistors of the electrical resistors of the array of electrical resistors in a selected one of different alternate configurations in order to control the electrical resistance density.

* * * * *